United States Patent [19]

Guillou

[11] 4,352,011
[45] Sep. 28, 1982

[54] SUBSCRIPTION CARD FOR A VIDEOTEX RECEIVER

[75] Inventor: Louis C. Guillou, Bourgbarre-Saint Erblon, France

[73] Assignees: Etablissement Public de Diffusion dit "Telediffusion de France", Montrouge; L'Etat Francais, represente par le Secretaire d'Etat aux Poste et Telecommunications (Centre National d'Etudes des Telecommunications), Issy les Moulineaux, both of France

[21] Appl. No.: 114,515

[22] Filed: Jan. 23, 1980

[30] Foreign Application Priority Data

Feb. 6, 1979 [FR] France ................ 79 02996

[51] Int. Cl.³ ............................ G06K 19/06
[52] U.S. Cl. ...................... 235/375; 235/487; 235/492
[58] Field of Search ......... 235/375, 379, 380, 381, 235/382, 492, 487; 358/115, 124

[56] References Cited

U.S. PATENT DOCUMENTS

| 4,058,830 | 11/1977 | Guinet | 358/115 |
| 4,092,524 | 5/1978 | Moreno | 235/487 |
| 4,105,156 | 8/1978 | Dethloff | 235/487 |
| 4,115,662 | 9/1978 | Guinet | 358/115 |
| 4,204,113 | 5/1980 | Giraud | 235/380 |
| 4,211,919 | 7/1980 | Ugon | 235/487 |

FOREIGN PATENT DOCUMENTS 2184926 12/1973 France .
2311360 12/1976 France .

Primary Examiner—Harold I. Pitts

[57] ABSTRACT

A subscription card for videotex receivers, comprising:
(a) a support,
(b) means for processing the information, comprising in particular a control unit governing an arithmetical and logical unit and a live memory,
(c) an interface permitting exchanges between the card and the apparatus in which it is inserted (charging station or receiver), further comprising:
(d) a programmable memory comprising a plurality of locations for receiving numerical subscription blocks $C_i$,
(e) a dead memory containing instructions for proceeding with the recording and selection of said subscription blocks, and for carrying out a calculation,
(f) a calculation circuit receiving, from the receiver in which the card is inserted, numerical messages $M_i$ and receiving from said programmable memory a numerical subscription block $C_i$, this circuit being adapted to work out an algorithm whose parameters are provided by the subscribers' keys $C_i$ on instructions obtained from the second dead memory and delivering, after the calculation, a numerical signal representing an operating key K.

1 Claim, 4 Drawing Figures

SUBSCRIPTION CARD FOR A VIDEOTEX RECEIVER

BACKGROUND OF THE INVENTION

This invention relates to a subscription card for a videotex receiver.

The invention can be used in the transmission and display of information on television receivers for purposes of entertainment, information or education. It can advantageously be applied to the system known as "ANTIOPE" (Numerical Acquisition and Televisualisation of Images Organised into Pages of Script) and to the so-called "TITAN" system (Interactive Teletext Terminal Called by Numbering). It is known that the former is essentially a broadcast videotex system (i.e. unidirectional) by means of which alphanumerical information organised into pages and magazines can be put into television lines and that the second is essentially an interactive videotex system (i.e. two-directional) compatible with the ANTIOPE system and affording access to data bases (general information, directories, etc.) and to interactive services (transactions, messages, education) through the telephone system.

In the ANTIOPE system, the distribution of information is effected by a method known as "DIDON" (Distribution of Numerical Data) which is a method of distribution in packets, compatible with the distribution of the television signal.

These systems have already been described in numerous articles or patent applications, notably the ANTIOPE system, a detailed description of which can be found in the following documents, which should be regarded as incorporated in this application:

the article by Y. Guinet entitled: "Etude comparative des systemes de télétexte en radiodiffusion. Quelques avantages de la diffusion des données par paquets appliquée au télétexte" which appeared in the U.E.R. Cahier Technique, no. 165, October 1977, pages 242 to 253;

the article by B. Marti and M Mauduit entitled "ANTIOPE, service de télétexte", which appeared in the journal "Radiodiffusion Télévision", 9th year, no. 40, November-December 1975, 5/5, pages 18 to 23;

the "Specification du Systeme de télétexte ANTIOPE", edited by the Centre Commun d'Etudes de Télévision et Télécommunications (CCETT);

French patent application no. 75 18319, filed on June 6, 1975 and entitled "Data distribution system";

French patent application no. 76 27212, filed on Sept. 6, 1976 and entitled "System for the numerical transmission and displaying of text on a television screen";

French patent application no. 76 29034, filed on Sept. 22, 1976 and entitled "Improvements to systems for the numerical transmission and displaying of texts on a television screen";

the French application for a certificate of addition no. 77 17625, filed on June 3, 1977 and entitled "Data distribution system".

The advent of services of the ANTIOPE and TITAN types raises the question of their taxation, i.e. the implementation of a system by means of which the audience can be identified and monitored. This question arises more generally with any broadcast service tending to make the broadcasting systems more viable by better use of the resources.

Taxation of the subscription type constitutes a both flexible and durable relationship between a service and its users. Such a method of taxation is particularly justified in broadcasting.

Taxation of the type based on consumption may also be used; this method of taxation is fundamental for "interactive" systems (where there is a dialogue between the subscriber and the information source, as in the case of the TITAN system); however, it is of secondary importance in broadcasting systems (in which information is transmitted in one direction to the subscribers, as with ANTIOPE).

There may be intermediate systems known as "quasi-interactive" systems wherein the content of the distribution source is continuously modified to meet the requirements of the users, which are transmitted via a plublic data network. The advent of new distribution means with a very large capacity, such as satellites, will develop this quasi-interactive mode considerably, thus making it necessary to implement a system for controlling access to the information provided.

The problem of access control raises above all the problems of locking up the information when it is broadcast and unlocking it when it is received. Naturally these problems must be resolved in accordance with the specificity of the teletext system to be controlled. In particular, the method of scrambling the information and restoring the intelligibility of the information should not harm the performance of the system.

The essential elements of a system provided with means for controlling access to the information can briefly be described in order to aid understanding of the present invention. This system is shown in FIG. 1.

First, this system comprises known elements characteristics of the ANTIOPE videotex system, namely an emitting centre 2 and receiving stations 4.

The emitting centre receives information from one or more sources of information 5 and comprises:

means 6 for composing a magazine consisting of pages organised into lines of characters, if such means are not already included in the source of information;

a circuit 10 for memorising the magazine in the form of numerical signals grouped into octets (8 binary elements), a junction 11 connected to the circuit 10, a distribution multiplexer 12 for inserting the information in the lines of a television signal, this device using the DIDON procedure referred to above.

Each receiving station comprises:

a circuit 14 for receiving and demodulating said television signal, a line 16 for processing the video picture signals, a line 18 for processing numerical signals, this line comprising, in particular a numerical data decoder, and finally a display means 20.

In this type of system, the numerical signals transmitted are grouped in the form of octets which are subdivided into control octets and data octets. The control octets indicate, in particular, the tops and bottoms of pages and beginnings and ends of lines. The data octets, inserted between the control octets, correspond to characters contained in the lines. All these octets, both control octets and data octets, comprise a heavy binary element which is an odd element. The octets wherein the 6th and 7binary elements are zero are the control octets and play a special part in the system.

The system described in this application further comprises:

(A) in the emitting centre 2;

(a) a generator 22 delivering a numerical signal representing an operating key K, this key changing randomly at predetermined intervals of the order of a few minutes, for example;

(b) automatic locking means 24 comprising:

(i) a comparator 28 with an input connected through the junction 11 to the magazine memorising circuit 10 from which it receives clear octets; this comparator is capable of distinguishing, among these clear octets, those wherein the 7th and 6th binary elements are zero; this comparator has two outputs 31 and 32, the first carrying these octets wherein the 7th and 6th binary elements are zero and is connected to the distribution multiplexer 12 (through a junction 11'), and the second carrying the clear octets $d_j$ wherein the 7th and 6th binary elements are not zero;

(ii) a logic circuit 34 of the OR-exclusive type with two inputs, one of which is connected to the second output 32 of the comparator 28 from which it receives the clear octets $d_j$ wherein the 6th and 7th binary elements are not zero; this logic circuit has an output which carries odd-numbered coded octets $D_j$, the coded octets then being directed (through junction 11') towards the distribution multiplexer 12;

(c) a generator 26 of encoding octets $C_j$, controlled by the automatic means 24 from which it receives octets indicating the page numbers and line numbers of the data to be transmitted and the signal corresponding to the operating key K; this generator of octets 26 has an output n1 which delivers, for each data octet $d_j$ of a displayable line, an encoding octet $C_j$, this octet having an even-numbered 8th binary element and 7th and 6th binary elements of zero, this octet being applied to the second input of the gate 34.

(B) in each receiving station 4:

(d) a circuit 36 delivering a numerical signal representing the operating key K in use in the emitting station, (e) automatic unlocking means 38 comprising:

(i) a comparator 42 with an input receiving the coded octets; this comparator is adapted to distinguish, among these coded octets, those wherein the 7th and 6th binary elements are zero, this comparator having two outputs 43 and 44, the first carrying these octets wherein the 7th and 6th binary elements are zero, this first output being connected to the display means 20, whilst the second carries the coded octets $D_j$ wherein the 7the and/or 6th binary elements are not zero, (ii) a logic circuit 46 of the OR -exclusive type with two inputs, one connected to the output 44 of the comparator from which it receives the coded octets $D_j$, this logic circuit having an output which carries decoded octets $d_j$ which are then directed towards the display means 20, (f) a generator 26' of decoding octets, controlled by the automatic unlocking means from which it receives the octets indicating the page numbers and line numbers of the data transmitted, and the signal corresponding to the current operating key K; this generator of decoding octets has an output 41' which delivers, for each coded octet received, a decoding octet $C_j$ having a heavy binary element which is forced to zero and 7th and 6th binary elements of zero, these octets being applied to the second input of the gate 46.

Locking and unlocking means of this kind can advantageously be used to solve the problem of taxation referred to hereinbefore. For this purpose it is provided, in addition to the operating key whose function has just been defined, subscribers' keys which are generated randomly by a taxation administration centre. These keys have a relatively long service life (from 1 to 12 months), in relation to that of the operating key (which is of the order of a few minutes).

To illustrate the operation of this double key system, one can take the example of a subscription plan using four types of subscription: 1 month, 3 months, 6 months and one year. In addition to its duration, a subscription is characterised by the month in which it starts. Thus, with a plan of this kind, in a given month and for a given service, there are 22 subscribers' keys liable to be used by the users; a monthly key, three three-monthly keys, six six-monthly keys and twelve yearly keys.

Each month, the taxation administration centre provides each distribution centre with a list of 22 subscribers' keys in use for each service distributed by this centre. In addition, it provides the subscription sales points with another list of 4 keys which are to start in the following month (one month, three months, six months and one year), for each service, with the prices of the subscriptions.

A suitable machine, installed in each sales point, records some of these keys in the form of blocks of subscriptions on holders provided for this purpose (such as, for example, information-bearing cards of the credit-card type). The users of the service then insert these cards in their receivers.

For each paying service, approximately every five minutes a new operating key K is generated at random, by each distribution centre concerned. Thus, during a session of a service (one hour or several hours), there may be several dozen operating keys succeeding one another.

As soon as a distribution centre generates a new operating key K, it calculates, for each subscribers' key in use $C_i$ for this service, a message $M_i$ by means of an algorithm $M_i = F_{C_i}(K)$, in which the keys $C_i$ act as the parameters.

Thus, for a service having the subscription plan indicated above, at any one time there are 22 different message in force. The service life of a message is equal to that of the operating key K and for a given service at any one time there are as many messages as there are current subscribers' keys.

All the messages $M_i$ in force together constitute the access-controlling information associated with the service being broadcast. This access control information is obviously not locked up by the electronic lock.

These means for controlling access to the information are shown in FIG. 1. They comprise:

(A) a subscription administration centre 100, which generates numerical signals corresponding to the subscribers' keys $C_i$, these keys changing randomly at long intervals of the order of a month and according to plans analogous to that given hereinbefore by way of example;

(B) in the emitting centre:

a circuit 102 for forming messages $M_i$ which receives, from the center 100, the signals corresponding to said subscribers' keys $C_i$, and, from the generator 22, the signal corresponding to the operating key K. These messages are obtained by means of an algorithm $F_{C_i}(K)$ the parameters of which are provided by the $C_i$'s. The circuit 102 delivers as many messages $M_i$ as there are subscribers' keys $C_i$, these messages changing with operating key K. All these messages are organised into a special page 104 known as the access control page. This page is transmitted cyclically by the multiplexer 12 but is not displayable;

(C) in each receiving station:

(i) a subscription holder 106 which contains a memory 108 in which is recorded at least one subscription block representing one of the subscribers' keys $C_i$, (j) a circuit 110 for restoring the operating key K, connected on the one hand to the circuit 18 from which it receives a message $M_i$ taken from the access control page and selected by the subscription index and, on the other hand, to the memory 108 of the subscription holder from which it receives the subscribers' key $C_i$. This circuit 110 develops an algorithm $K = G_{C_i}(M_i)$ for restoring the signal corresponding to the operating key K used in the emitting station;

(D) at least one charging station 112 connected to the subscription administration centre 100 from which it receives the signals corresponding to the different subscribers' keys $C_i$ generated by this centre; each of these stations is adapted to receive temporarily subscription holders and to record one of the subscribers' keys $C_i$ in their memories 108.

BRIEF SUMMARY OF THE INVENTION

The present invention relates precisely to a particular embodiment of a subscription card such as the assembly 36 in FIG. 1.

The card according to the invention is of the same type as the credit cards used in commerce and banking and, as such, comprises known elements such as the support, interface, data processing circuits, etc. However, it contains additional means which make it suitable for fulfilling a new function in a system for controlling access to information as described above. This function is essentially to enable the electronic lock to be opened in the videotex receiving sets.

More precisely, the invention relates to a subscription card for videotex receivers, comprising:

(a) a support, (b) data processing means comprising in particular a control unit controlling an arithmetical and logical unit and a live memory, (c) an interface enabling exchanges between the card and the apparatus in which it is placed (charging station or receiver)

(d) a programmable memory comprising several locations for receiving numerical subscription blocks $C_i$, (e) a dead memory containing instructions for carrying out the recording and selection of said subscription blocks, and for carrying out a calculation, (f) a calculation circuit receiving, from the receiver into which the card is inserted, numerical messages $M_i$ and receiving from said first memory a numerical subscription block $C_i$, this circuit being adapted to work out an algorithm $K = G_{C_i}(M_i)$ the parameters of which are provided by the subscribers' keys $C_i$, on instructions obtained from the second dead memory and, after calculation, delivering a numerical signal representing an operating key K.

BRIEF DESCRIPTION OF THE DRAWINGS

In any case, the features and advantages of the invention will become more apparent from the following description of some exemplary embodiments given by way of an illustration without being in any way restrictive. This description refers to the drawings, wherein.

DETAILED DESCRIPTION OF THE PREFERRED EMBODIMENTS

Figure 2:
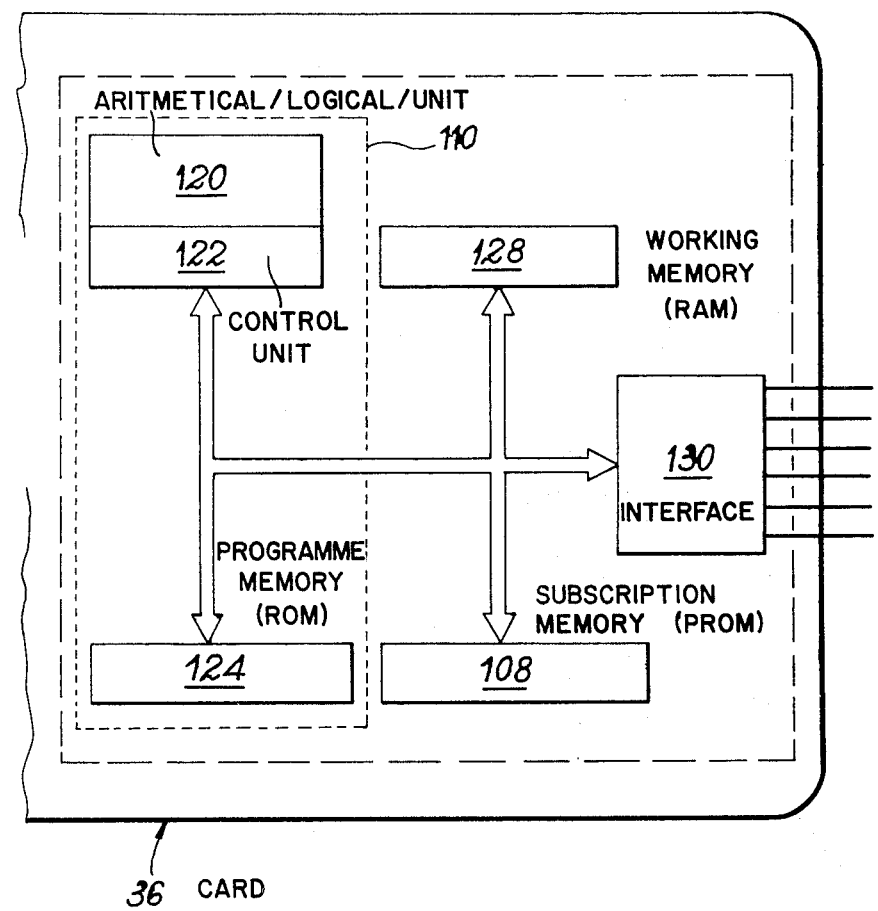
FIG. 2 shows a synoptic plan of the circuits of the card according to the invention.

The card shown in FIG. 2 comprises, on a support 36:

An arithmetical and logical unit 120 governed by a control unit 122, the whole constituting a central unit capable of carrying out:

arithmetical and logical operation: addition, shifting, comparison, "AND logic", "OR-exclusive", conditional logical branchings counting of events A programme memory 124 of the ROM (Read Only Memory) type containing instructions describing the operating phases (recording, selection, calculation), the assembly 120/122/124 constituting the circuit 110;

A subscription memory 108 of the PROM type (Programmable Read Only Memory) for acquiring blocks of subscriptions, A working memory 128 of the RAM type (Random Access Memory) for storing the intermediate results of the calculations, An interface 130 for communication with the outside, governing a connector with at least 6 contacts (return to zero, earth, inputs/outputs, supplies, timer, extension) which permits the exchanges between the card and the subscription-validating machine, on the one hand, and between the card and the users' receiver, on the other hand.

All these elements may be put together in a monolithic integrated circuit. All the elements together form the means 36 in FIG. 1.

The subscription memory 108 is organised into blocks of 21 octets, each capable of receiving a subscription block. Thus, a PROM of 4,096 binary elements is capable of containing up to 24 subscription blocks.

The locations taken up on the card are referenced by "busy" flags. A subscription card is full when all the flags are displayed.

The operation of this card is characterised by three phases: recording, selection and calculation.

(A) The recording phase starts with the locating of the first non-displayed flag, i.e. the first location which is free in the memory 108; then, under the control of the charging station, the central unit of the card supervises the inscription of the subscription block requested by the user.

A subscription block is made up of four areas, for example:

(1) an "operating code" of 16 binary elements which designates the service in question, (2) a "subscription index" of 8 binary elements which characterises a subscription for a given service. Two of these binary elements indicate the type of subscription (1, 3, 6 or 12 months) and the other six indicate the month in which the subscription starts (1 to 60 modulo 5 years), (3) a "subscribers' key" of 128 binary elements which is the basic information of the block, (4) a "cyclic redundancy code" of 16 binary elements which bears on the preceding 152 binary elements and makes it possible to check the subscription block before it is used.

A subscription block is thus made up of 168 binary elements, i.e. 21 octets.

The recording phase is only one step of the total subscription operation. In fact, first of all it is necessary to check that the card is functioning correctly using a test subscription block incorporated in the circuit when it is produced. This test subscription block checks the authenticity of the card as it goes through.

Moreover, after the recording phase, the satisfactory progress of the operation must be verified. As it is not possible to read back what has just been written, another test therefore has to be made using the new block inscribed.

(B) The selection phase consists in testing the subscription blocks in order to locate one which corresponds to an operating code indicated by the receiver from the address indicated, the response consisting in supplying the subscription index and the address of the located block.

The selection phase thus starts by the receiver supplying an operating code. The control unit of the card then searches for the first block bearing this code in the subscription memory. When it finds one, it verifies it using the cyclic redundancy code. If all is well, the card replies to the receiver by providing it with the subscription index of the block found.

Other results may be: "the cyclic redundancy code is wrong", and "there is no suitable subscription on this card". These two results are passed on to the receiver by abnormal indications such as $1^8$ and $0^8$, which are formed from 8 binary elements of 1 or 0.

The selection phase thus plays a double role: selection itself and verification of the subscription block in question.

(C) The calculation phase consists in calculating the operating key K from the message transmitted by the receiver and from the subscribers' key found in the card's memory. In other words, when the receiver has located the proper message in the access control page, it sends this message to the card which itself has marked the suitable subscription block.

This calculation phase is repeated each time the access control page is updated, provided that the user has not disconnected himself from the service in question.

Figure 3:
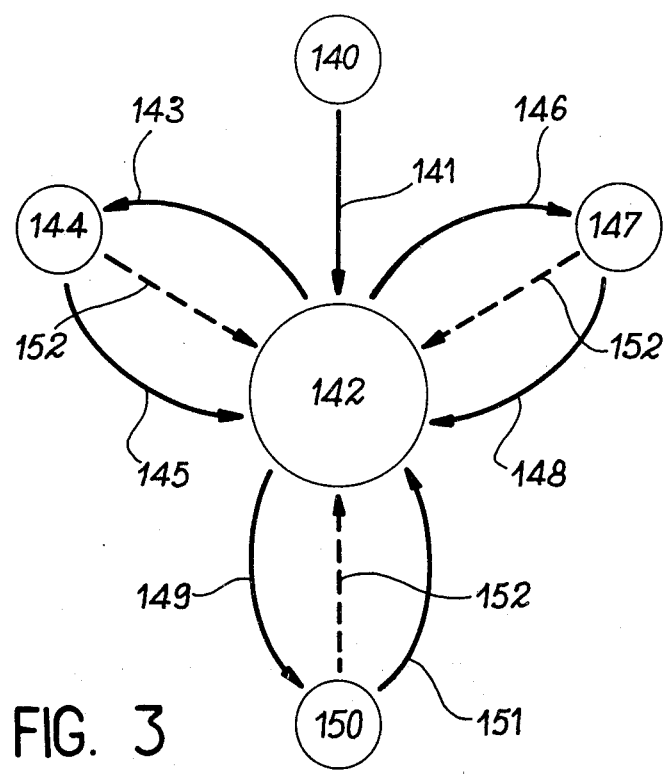
FIG. 3 is a diagram illustrating the method of operation of the card, FIG. 4 schematically shows a charging station for subscription cards.

The diagram in FIG. 3 shows the different states and transitions between states of the automatic means consisting of the circuits of the card. The symbols bearing reference numerals have the following meanings:

140—state of rest
141—made live
142—state of sleep
143—recording order to an address
144—recording of a subscription block
145—discharge
146—order to select a service from an address
147—selection and testing of the block
148—supplying the subscription index and its address
149—order to calculate the message using the block appearing at the address indicated
150—calculation of the operating key
151—supplying the operating key
152—return to zero.

The advantage of this procedure is that it avoids any live memorisation of the preceding operations in the card and thus means that the operating system does not have to be closed down.

The automatic means does not have a memory, and this avoids many cases of conflict and error. Morevoer, the card becomes deaf whilst an order is being carried out, until it gives an answer.

Am example of a calculation which might be carried out by the card according to the invention will now be described. However, it is first necessary to describe the algorithm by means of which the messages in the emitting centre of the videotex system can be calculated from an operating key and subscription blocks.

The messages are calculated from the subscribers' keys $C_i$ and the key K in the emitting centre by the circuit 102 which is organised around a microprocessor. This circuit is programmed to implement an algorithm which uses the subscribers' keys $C_i$ (128 binary elements) and an operating key K of 56 binary elements, in the following way:

(1) a confusion redundancy word $\pi$ is formed, which comprises 61 binary elements generated at random each time the algorithm is used;

(2) $\pi^{-1}$, the inverse of $\pi$ modulo $2^{61}-1$, is calculated by an arithmetic programme using a variant of Euclid's algorithm;

(3) a first multiplication by another arithmetical programme: $\nu = K \cdot \pi^{-1}$ modulo $(2^{61}-1)$ is carried out;

(4) $\gamma$, the inverse of C modulo $2^{127}-1$, is calculated by a programme similar to that of (2);

(5) finally, the message is calculated by a programme similar to (3): $M = \gamma \cdot (\gamma + 2^{64} \cdot \pi)$ modulo $(2^{127}-1)$.

Once the messages have been thus formed, the algorithm to be worked out in the card for restoring the operating key K from a message $M_i$ and a subscribers' key $C_i$ is as follows:

(1) The message $M_i$ (127 useful binary elements) is taken octet by octet and multiplication by $C_i$ is carried out. In this way a $\mu$ is formed:

$$\mu = M \cdot C \text{ modulo } (2^{127}-1)$$

According to the construction of M on emission, the binary elements 1 to 61 of $\mu$ represent the word $\nu$, whereas the binary elements 65 to 125 represent the word $\pi$. Obviously, binary elements 62, 63, 64, 126 and 127 should be zero. If they are not, the word $\nu$ is returned to zero before continuing with the calculation.

(2) $\pi$ and $\nu$ are multiplied thus eliminating the confusion redundancy, and $K = \nu \cdot \pi$ modulo $(2^{61}-1)$ is obtained.

A new probability test is used here since, as K has 56 useful binary elements, the elements 57, 58, 59, 60 and 61 should be zero. If this is not the case, K is returned to zero before continuing the procedure.

(3) the 56 useful binary elements of K are then available in the form of eight odd-numbered octets.

Figure 4:
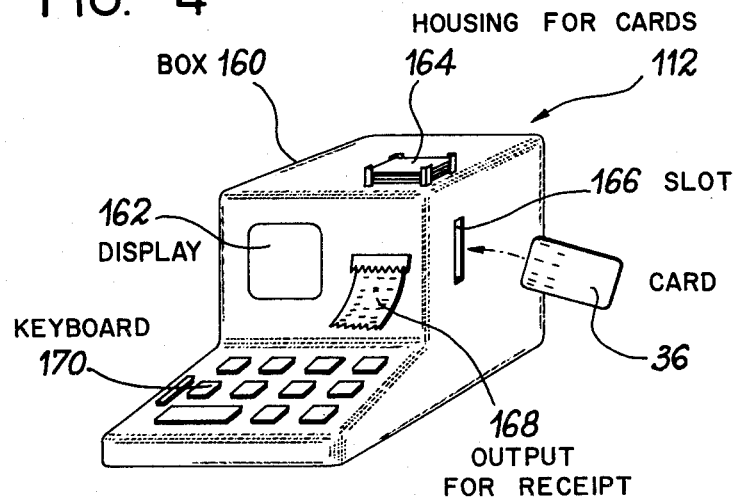

FIG. 4 schematically shows a charging station for the cards described above. This station comprises, on the outside:

a box 160 containing a display screen 162, a housing 164 for new cards, a slot 166 for inserting the cards to be charged, an output 168 for a printed receipt, a keyboard 170 for controlling the operations to be carried out.

This station comprises, inside the box 160:

an interface adapted to be coupled to the interfaces of the cards inserted, a memory containing the list of subscription blocks for sale, with the corresponding prices.

a circuit for charging the subscription required by the user in the card inserted. This circuit is adapted to locate an empty location in the programmable memory of this card and to enter the subscription block thereon, the latter consisting of a subscription key, a subscription index, an operating code and finally a cyclical redundancy code.

Figure 1:
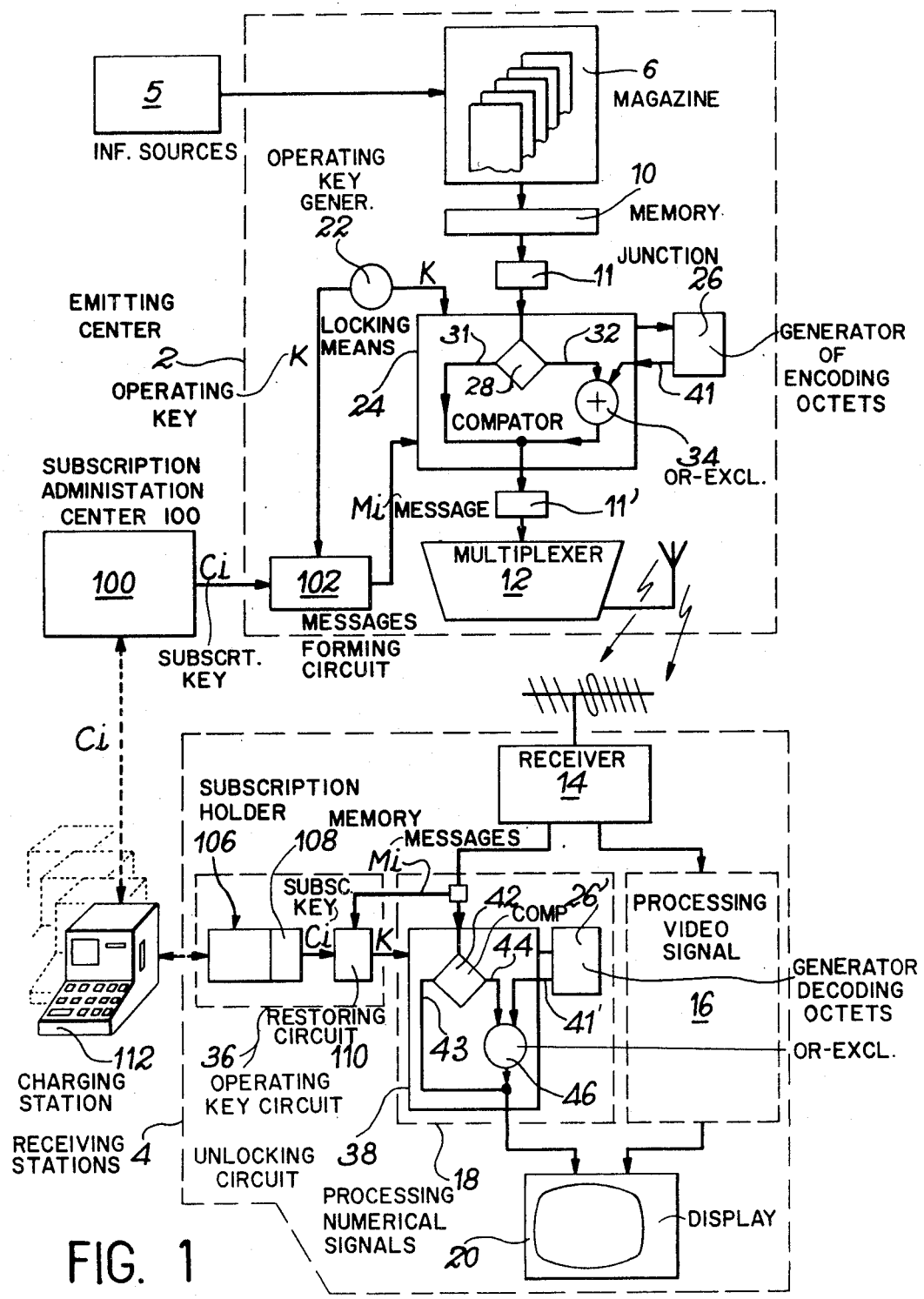
FIG. 1, already described, shows a videotex system provided with means for controlling access to the information.

Preferably, the charging station contains a message and a test key for verifying the authenticity of the cards inserted, using the test subscription which they contain for this purpose. A charging station of this kind is connected to the subscription administration centre, as shown in FIG. 1: from this centre it receives lists of subscription blocks for sale and the price list, and in return it supplies recordings of the transactions and the sum of the charges taken.

This record of the transactions then makes it possible to determine the audience for each service and to make the best possible distribution of the financial income from the subscriptions. The receipt is useful in cases of dispute regarding the card.

What is claimed is:

1. A subscription card, comprising:
    a central unit constituted by an arithmetical and logical unit and a control unit governing said arithmetical and logical unit,
    a Programmable Read Only Memory (PROM),
    a Random Access Memory (RAM) acting as a working memory,
    a Read Only Memory (ROM) containing instructions for:
     (i) recording numerical subscription keys $C_i$ in said Programmable Read Only Memory when said card is inserted in a charging station deliverying said subscription keys Ci,
     (ii) carrying out, in said arithemetical and logical unit, a calculation, when said card is introduced in a videotex receiver, said receiver delivering to said card messages Mi which are known functions of subscriptions keys Ci recorded in said PROM and of an operating key K, said calculation being the restoration of said operating key K from the received messages Mi and the recorded keys Ci, and
    an interface for exchanging signals defining subscription keys Ci, messages Mi and operating key K, between said card and said charging station and between said card and said receiver.

* * * * *